United States Patent [19]

Kramer

[11] Patent Number: 4,941,888

[45] Date of Patent: Jul. 17, 1990

[54] COMMODITY STORAGE PILE PROTECTION WITH A RAINWATER HOLDING SPONGE

[76] Inventor: Fritz Kramer, 911 W. Promontory Dr., Newport Beach, Calif. 92660

[21] Appl. No.: 297,956

[22] Filed: Jan. 17, 1989

[51] Int. Cl.$^5$ ............................ C10L 9/00; B05D 1/02
[52] U.S. Cl. ........................................ 44/541; 422/40; 427/421
[58] Field of Search ................. 44/501, 541, 542, 620; 427/421; 422/40

[56] References Cited

U.S. PATENT DOCUMENTS

| | | | |
|---|---|---|---|
| 2,204,781 | 6/1940 | Wattles | 44/6 |
| 2,346,650 | 4/1944 | Bornstein | 44/6 |
| 2,860,856 | 11/1958 | Bauer | 422/133 |
| 3,431,061 | 3/1969 | Chase et al. | 422/40.0 |
| 3,952,907 | 4/1976 | Ogden et al. | 220/18 |
| 4,107,105 | 8/1978 | Korf | 521/80 |
| 4,214,875 | 4/1980 | Kromrey | 44/6 |
| 4,238,536 | 12/1980 | Koch et al. | 427/421 |
| 4,518,393 | 5/1985 | Pace et al. | 44/501 |
| 4,810,255 | 3/1989 | Fay, III et al. | 44/541 |

FOREIGN PATENT DOCUMENTS 127794  7/1983  Japan ...................... 44/501

*Primary Examiner*—Carl F. Dees
*Attorney, Agent, or Firm*—Auslander & Thomas

[57] ABSTRACT

Outdoor storage piles of a particulate solid commodity are protected from the weather by a novel, open celled, shrinkage controlled, water absorbing sponge blanket applied to the pile in a rainwater protecting thickness, and a method for producing said sponge blanket employing an aminoplast resin prepared from urea formaldehyde or a prepolymer of urea and formaldehyde and modified with 4 to 12% fructose, and a suitable foaming agent containing an acid accelerator, such as phosphoric acid in a ratio of 2% by weight of resin.

13 Claims, No Drawings

COMMODITY STORAGE PILE PROTECTION WITH A RAINWATER HOLDING SPONGE

The present invention relates to a method for protecting outdoor storage piles of a commodity by covering it with a water absorbing, open celled sponge blanket and piles of said commodity which are covered with said sponge blanket.

BACKGROUND OF THE INVENTION

A serious problem exists in coal storage at power plants. Rainwater penetrates into coal, increasing its moisture content, washing out coal dust which runs into streams and lakes, causing fish kills and other environmental problems. Numerous methods have been proposed to correct this problem, such as films and rigid coated celled foams. These measures are inadequate and do not prevent rainwater infiltration, due to the fact that neither films nor spray on foams can be put down without openings which allow the penetration of water.

Similarly, various other particulate solid commodities such as lignite, limestone, various forms of wood, tailings from mining operations and grains such as corn, wheat, barley and oats, all which are often stored outdoors in piles whereby they are exposed to the weather elements such as rain and melting snow, are adversely affected by such exposure.

DESCRIPTION OF THE PRIOR ART

The need for the protection of commodity piles stored outdoors has long been known and various measures have been taken to protect them. Typical of the prior art is U.S. Pat. No. 2,346,650, where a water soluble cold setting urea formaldehyde resin, similar in character to those ordinarily used in the manufacture of plywood, is sprayed onto coal or coal dust, to form an impervious coating. The coating is only a superficial water resistant protective cover from which water may run off.

U.S. Pat. No. 3,431,061, discloses wood piles protected by polyethylene or polyvinyl chloride sheets and the use of expensive polyurethane foams which are spray coated in several layers to form a cocoon shaped barrier material surrounding the wood pile. Such a cocoon is resistant to the passage of air or moisture.

Other gas impermeable layers of expensive foam have been used with wood products.

The permeability characteristic of an aminoplast resin foam has been recognized. U.S. Pat. No 3,952,907, discloses use of such a foam as a safety factor for the absorption of liquid from a ruptured tank.

Typical of the prior art efforts to prevent rain or melting snow from penetrating through a mass of a stored commodity is U.S. Pat. No. 2,204,781, which provides for the spraying of paraffin oils with a high wax content over coal piles to form a congealed, combustible coating to preclude superficial penetration of water.

Other coatings for coal piles, which provide superficial coverings are disclosed in U.S. Pat. No. 4,214,875, which includes the application of a semi-fluid, capable of solidifying, comprising organic binders, such as wax, tar or asphalt plus a particulate organic solid filler.

Also typical of the prior art is U.S. Pat. No. 4,238,536, where a commodity pile is protected by coating with a gelable composition to prevent water incursion. The patent details the difficulties of solidified coatings with their lack of flexibility, the significance of cracking and weathering and the expense of prior art methods.

U.S. Pat. No. 4,518,393 discloses coal pile protection for the prevention of spontaneous combustion, employing a hardenable sodium silicate coal fine coating to substantially exclude water and atmosphere.

Heretofore, in the preparation of a cellular urea formaldehyde foam prepared by discharging solution, catalyst and compressed air into the atmosphere, the cracking characteristic of the foam thusly prepared, was considered undesirable. Therefore, methods were sought to prevent such cracking by expedients such as those disclosed in U.S. Pat. No. 4,107,105 where a stabilized urea formaldehyde foam prepared in accordance with U.S. Pat. No. 2,860,856 was protected from shrinkage cracks by the inclusion of glucose, fructose and/or sucrose.

SUMMARY OF THE INVENTION

Contrary to the teaching of the prior art, according to the present invention the shrinkage characteristics of the aminoplast resin foams, considered to be detrimental in the prior art, are now employed to provide an open celled, shrinkage controlled, water absorbing sponge blanket which substantially covers a particulate solid commodity pile which is stored outdoors with a rainwater protecting thickness layer of said sponge which shields it from the weather.

The invention further provides a novel and economical method of producing an open celled, shrinkage controlled, water absorbing sponge blanket for weather protection of an outdoor storage pile of a particulate solid commodity which comprises the steps of:

(a) forming a hardenable plastic foam by discharging it into the atmosphere onto said pile with a gas under a pressure of from 100 to 160 p.s.i., and an aqueous solution containing a major amount of methylolurea, dimethylolurea or methylolurea or dimethylolurea, 4 to 12% fructose, by weight based on the weight of resin and a suitable foaming agent, until said pile is substantially covered with a rainwater protecting thickness layer; and (b) allowing the water to evaporate.

It is an object of the invention to provide a simple, economical method for protection of commodity piles stored outdoors. While a variety of particulate solid commodities, such as coal, lignite, limestone, various grains, wood, wood chips, sawdust and tailings from mining operations, may be protected by the invention method, a preferred such commodity is coal.

Another object of the invention is to provide an open celled, shrinkage controlled, sponge blanket which, after drying on the commodity pile to be protected, will be able to absorb a substantial amount of rainwater with little or no water penetration of the blanket. A preferred such sponge blanket is one having a linear shrinkage factor of from 2 to 6% and water permeability of from $1.5 \times 10^{-5}$ to $5 \times 10^{-5}$ cm/second and a particularly preferred sponge blanket is one having a linear shrinkage factor of from 3 to 5%. An especially preferred water permeability for said sponge is $4 \times 10^{-5}$ cm/second. The density of a preferred dry sponge is in the range of from 0.5 to 1.0 pound per cubic foot.

While the aminoplast resins of the invention can be prepared from urea and formaldehyde, a preferred method employs the well known prepolymers methylolurea, dimethylolurea alone, or mixtures thereof. Also preferred are mixtures of one or both of said prepolymers containing 4–12% fructose.

It is a further object of the invention to provide a commodity storage pile covered with a rainwater protecting thickness layer of the sponge blanket of the invention. A preferred such layer is one having an average thickness of from one to three inches (2.5 to 7.5 cm.) and an especially effective layer is one having an average thickness of from 1.0 to 1.5 inches (2.5 to 4 cm.) for reasons of efficiency and economy.

Another object of the invention is to provide an aminoplast sponge blanket that does not release harmful amounts of formaldehyde, especially when it is exposed to water for extended periods. Thus, a preferred such sponge blanket is one that will pass standard aquatic toxicity tests such as those devised by the Environmental Protection Agency (EPA).

Yet another object of the invention is to provide a protective sponge blanket that has an extended service life when covering an outdoor storage pile of a particulate solid commodity. A preferred such sponge blanket is one having a useful service life of from 3 to 12 months, or longer.

A further object of the invention is to prevent erosion of the slopes of a commodity pile by reducing oxidation of the commodity in the presence of air and solar energy.

DETAILED DESCRIPTION

While numerous prior art methods have been described for protecting various commodity piles from the elements, none have been entirely successful. Coal stockpiles particularly are ravaged by outdoor storage and cause considerable environmental damage due to loss of dust from water runoff and from wind exposure. Coal stockpiles are routinely stored outdoors in the vicinity of factories and power plants which use coal as an energy source. Coal fired power plants are ordinarily required to maintain coal stockpiles which will supply power for several months in the event of an interruption of the supply of coal.

Coal and other combustible commodities which are stored outdoors are often compacted by means of heavy compactors to expel the air and thus, minimize the chance of spontaneous combustion taking place within the stockpile. With compaction of coal, for example, considerable amounts of coal dust are generated and the dust is carried by the wind, rainwater or snow melt runoff with adverse environmental consequences.

Furthermore, the exposed surfaces of such commodities are subject to damage from the sun's rays. Coal particularly, is susceptible to surface damage in this manner because the black surface absorbs much of the solar energy which causes oxidation and release of volatile gaseous products such as methane.

During dry spells a commodity such as coal loses its natural moisture and during rain, water wets the coal, thus reducing its potential thermal energy per unit weight. During winter months snow melts and refreezes making the coal difficult to manage. During prolonged rain, rivulets form on the pile which can cause washouts from the commodity pile.

All of these problems are substantially eliminated by the invention. By application of a rainwater protecting thickness layer, preferably of from about one to three inches in thickness, of the herein described aminoplast foam which hardens into a protective sponge blanket over the pile. An especially preferred rainwater protecting thickness is from 1.0 to 1.5 in. for reasons of economy and efficiency.

The aminoplast foams of the invention are produced by the well known method of Bauer, U.S. Pat. No. 2,860,856 and the foam is sprayed onto the commodity pile under high pressure and at high velocity, essentially as described previously by Kramer, U.S. Pat. No. 4,421,788.

The sponge blankets produced by the invention method are unique in that they protect a commodity such as coal from water damage brought about by rain or melting snow by absorbtion of the bulk of the water, thus preventing extensive runoff of water and the damage which would otherwise result from such runoff. At the same time, the sponge blankets of the invention have gas permeability properties which will greatly reduce air exchange and oxygen availability within the pile. As a result of this oxidation and spontaneous combustion within the pile is substantially reduced. A further advantage of the present aminoplast sponges is their fire suppressant property, due to their high nitrogen content which is released by the fire.

The term "aminoplast" is well known to those of skill in the art. It defines a class of thermosetting amino plastic resins made by the reaction of an amine or ammonia with an aldehyde. As used herein the term aminoplast refers to resins made from urea, formaldehyde or a prepolymer of urea and formaldehyde, optionally modified with fructose.

The novel sponge blankets produced by the invention process are preferably generated under a gas pressure of at least 100 pounds per square inch. A preferred such pressure is in the range of from 100 to 160 pounds per square inch. The preferred gas, for reasons of economy, is air.

As stated above, the invention process employs a catalytic amount of an acid accelerator. A variety of such accelerators will be well known to those of skill in the art. However, preferred such accelerators are phosphoric acid and oxalic acid. By the term "catalytic amount" as used herein means from about 0.2 to 2.0 percent of said acid accelerator, based on the weight of resin.

As to the density of the sponge blanket, it has been found that those having a density less than 0.5 lb./cu.ft., air dried (corresponding to about 1.5 lb./cu.ft. freshly formed), have overly large, fragile air cells with reduced holding ability. They are quite susceptible to serious wind damage. On the other hand, sponges having a density greater than 1.0 lb./cu.ft., air dried (corresponding to about 2.5–3.0 lbs./cu.ft. wet) have too many closed cells and shed more than absorb rain water—an effect not desirable because of the erosion effect of water runoff.

The ability of the foam to absorb and hold water is determined by the structure of its cells and the capillaries which connect the cells. When the foam is freshly generated, the capillaries are closed and filled with water from the resin. This water must dry out in order for the sponge to reach its full water holding and transmissivity characteristics. The denser the sponge, the more capillaries, the more water has to evaporate, the longer it takes for the sponge to achieve its full water holding characteristics.

In normal weather, 70 F., 40–50% relative humidity, it will take a one inch thick foam layer placed on a dry surface about four to six hours to lose one half of its water content, at which point it becomes a water sponge.

Shrinkage is a term which applies to the reduction in volume when the water in the resin leaves the capillaries. It is characterized by shrinkage cracks. Air dried urea formaldehyde resin is a hard, brittle mass. It is known that by adding plasticizers such a sorbitol or fructose the resin or foam mass becomes flexible and capable of stretching, thus reducing the shrinkage. Also, both sorbitol and fructose reduce the rate of water evaporation. These additives are good for insulation foams which require minimal shrinkage, but were believed to be counter productive for water absorption foams.

In the present invention it has been surprisingly found that use of a controlled amount of plasticizer such as fructose or sorbitol provides a foam which readily dries to a sponge having optimal properties for water absorption, shrinkage and density.

The amount of said placticizer that affords such optimal properties is from 4 to 12% by weight based on the weight of resin. An especially preferred plasticizer is fructose and a particularly preferred amount of fructose is from 7 to 10% by weight.

It has been found that the preferred sponges formed by the invention process have a linear shrinkage of from 2 to 6% and water permeability of from $1.5 \times 10$ to $5 \times 10$ cm/sec. Particularly preferred such sponges have a linear shrinkage of from 3 to 5% and a water permeability of about $4 \times 10$ cm/sec. When a sponge having these preferred properties is formed, more than 90% of the commodity pile remains covered after shrinkage takes place. The cracks which result are mostly superficial and have a width of no more than 0.25 inch (0.6 cm).

By contrast, foams having no plasticizer are found to have linear shrinkages of from 7 to 10%. Those having as much as 13% plasticizer, such as would be employed in an insulation foam, have a linear shrinkage of only 0.5 to 1.0%.

A number of commercially available foaming agents which are suitable for production of the invention sponge blankets will be known to those of skill in the art. Examples of such suitable foaming agents are sodium alkyl napthalene sulfonates.

EXAMPLE

Coal Pile Protection

A previously compacted coal storage pile having a slope which was 100 feet long and varying in its angle from 45 to 60 degrees was employed. The pile had a surface area of 4500 square feet.

A 55 gallon drum containing 50 gallons of urea formaldahyde resin prepolymer container 7% fructose by weight, is mixed with 52½ gallons of foaming agent; which two components are expanded into foam weighing approximately 2.5 lbs./cu.ft., by compressed air at a pressure of 100 p.s.i. The foaming agent was prepared by mixing 2½ gallons of concentrate with 50 gallons of tap water. The foaming agent concentrate consisted of a commercial alkyl naphthalene sulfonate and 10 lbs. phosphoric acid, that is 2% by weight phosphoric acid to resin. Approximately 330 cu.ft. of foam can be generated from this combination.

A one inch layer of foam was sprayed onto the compacted coal slope using a 55 cubic feet/minute compressor, 100 ft. of material hoses and a backpack mounted foaming gun equipped with a wand (the equipment is that disclosed by Kramer, U.S. Pat. No. 4,421,788). The gun enabled the operator to spray a one inch thick layer of foam up to 25 feet in front of him at a rate of 200 square feet/minute. The operator had a 100 ft. radius of operation before he had to move the compressor unit. The pile was covered in 30 minutes by two men, one of which handled the hoses.

The mixture of foaming agent solution and air is formed and mixed with the aqueous solution of prepolymer and fructose. The method is that of U.S. Pat. No. 4,421,788. A flattened nozzle having a slit width of 3/16 inch and length of 2.5 inches is employed. The foam is expelled at a pressure of 100 p.s.i. It comes out of the nozzle fully expanded, is liquid for a minute or so, then it gels and subsequently hardens into a spongelike foam. The resulting sponge blanket covering the coal pile dried out upon standing for a day to afford an open celled water absorbing sponge. Of course, the time required for drying will vary with the weather conditions.

Ten days later rain started which lasted for three days; on the second day three inches of rain fell. The stockpile was inspected the day after the rain stopped and compared with an unprotected stockpile of coal. Numerous washouts and gullying were observed on the slopes of the control pile, but no damage was observed in the pile covered with the sponge blanket. The foam itself was water logged but the coal underneath it was dry. Several days later the foam was suitably dried out.

The above prepared sponge is a neutral, non-toxic material. It is found to be acceptable in the EPA Aquatic Toxicity Test, Heavy Metals Test and Long Term Leachate Test (See Graven and Pohland, *Waste Management and Research*, 5, 41-53 (1987).

Its low mass, high nitrogen content and high ignition temperature (1200 F., 650 C.) suggest that it will not significantly participate in a fire.

The air dried sponge is found to have a gas permeability of 5-10 perm/inch as measured by ASTM C-355. Water permeability of the air dried sponge is $4 \times 10^{-5}$ cm/sec.

The linear shrinkage of the sponge upon drying is found to be 3%. The amount of shrinkage gives cracks which are no more than 0.25 inches wide. Thus, minimal amounts of rainwater can penetrate.

The dry sponge blankets have a density of between 0.5 to 1.0 lb/ft.

Upon storage during warm weather, in all cases, the internal temperature of the protected pile is considerably lower than that of the control pile.

Use of the above sponge blankets are found to have similar benefit in protection of storage piles of wood chips, sawdust, wheat, corn and limestone.

The terms and expressions which are employed are used as terms of description; it is recognized, though, that various modifications are possible.

It is also understood the following claims are intended to cover all of the generic and specific features of the invention herein described; and all statements of the scope of the invention which as a matter of language, might fall therebetween.

Having described certain forms of the invention in some detail, what is claimed is:

1. A weather protected outdoor storage pile of a particulate solid commodity which comprises said commodity substantially covered with a rainwater protecting blanket, said blanket comprising a plasticized foamed aminoplast resin, said plasticized foamed resin when air dried after having been initially placed having an air dried density of between 0.5 lb./cu.ft. and 1.0 lb./cu.ft., said air dried plasticized foamed resin having substantially open cells, said air dried plasticized foamed resin having a thickness of between one to three inches, said air dried plasticized foamed resin shrinkable within a range of from 2 to 6%, said air dried plasticized foamed resin after shrinkage covering substantially more that 90% of said particular commodity, and said air dried plasticized foamed resin after shrinkage including superficial cracks of about no more than 0.25 of an inch.

2. A weather protected outdoor storage pile of a particulate solid commodity which comprises said commodity substantially covered with a rainwater protecting thickness layer of an open celled, shrinkage controlled, water absorbing sponge blanket, said water absorbing sponge blanket comprising an aminoplast resin prepared from an aqueous solution of prepolymer resin of:
  (a) urea and formaldehyde, methylolurea, dimethylolurea or methylolurea or dimethylolurea modified with,
  (b) from 4 to 12% fructose by weight and, a suitable foaming agent, a catalytic amount of acid accelerator, said aqueous solutions being mixed with a gas under a pressure of from 100 to 150 pounds per square inch (p.s.i.) to form a hardenable plastic foam which dries to said sponge having a linear shrinkage factor of from 2 to 6% and water permeability of from $1.5 \times 10^{-5}$ to $5 \times 10^{-5}$ cm/sec.

3. A weather protected outdoor storage pile according to claim 2 wherein said commodity is coal.

4. A weather protected outdoor storage pile according to claim 2 wherein said acid accelerator is phosphoric acid or oxalic acid and said weight of fructose is from 7 to 10%.

5. A weather protected outdoor storage pile according to claim 2 wherein said acid accelerator is phosphoric acid or oxalic acid and, said foaming agent is present in 2% by weight of said resin.

6. A weather protected outdoor storage pile according to claim 2 wherein said sponge has a linear shrinkage factor of 3 to 5% and said commodity is coal.

7. A method of producing an open celled, shrinkage controlled, water absorbing sponge blanket for weather protection of an outdoor storage pile of a particulate solid commodity which comprises the steps of:
  (a) forming a hardenable plastic foam by discharging into the atmosphere onto said pile a mixture of a gas under a pressure of from 100 to 160 p.s.i. and an aqueous solution containing a major amount of methylolurea, dimethylolurea or methylolurea or dimethylolurea containing from 4 to 12% fructose by weight based on the weight of resin, and a suitable foaming agent, and a catalytic amount of an acid accelerator, until said pile is substantially covered with a rainwater protecting thickness layer; and
  (b) allowing the water to evaporate.

8. A method according to claim 7 wherein said acid accelerator is phosphoric acid or oxalic acid and, said foaming agent is preset in 2% by weight of said resin.

9. A method according to claim 7 wherein said commodity is coal.

10. A method according to claim 7 wherein said acid accelerator is phosphoric acid or oxalic acid and said weight of fructose is from 7 to 10%.

11. A method according to claim 7 wherein said sponge has a linear shrinkage factor of from 3 to 5%.

12. A method according to claim 11 wherein said commodity is coal.

13. A method according to claim 7 wherein said sponge has a linear shrinkage of from 3 to 5% and a water permeability of $4 \times 10^{-5}$ cm/sec.

* * * * *